United States Patent [19]
Weber

[11] 3,723,721
[45] Mar. 27, 1973

[54] LIGHTING SYSTEM FOR MOTOR VEHICLES

[75] Inventor: Martin Weber, Grossingersheim, Germany

[73] Assignee: S.W.F-Spezialfabrik For Autozubeeor Gustav Rau GmbH, Bietigheim, Germany

[22] Filed: Feb. 11, 1971

[21] Appl. No.: 114,560

[30] Foreign Application Priority Data

Feb. 21, 1970 Germany..................P 20 08 300.2

[52] U.S. Cl..................................240/7.1 A, 315/82
[51] Int. Cl...........................B60q 1/20, B60q 1/24
[58] Field of Search......240/7.1 A, 7.1 R; 315/82, 83

[56] References Cited

UNITED STATES PATENTS

| | | | |
|---|---|---|---|
| 2,383,202 | 8/1945 | Lawson | 315/83 |
| 2,197,838 | 4/1940 | Reno | 240/7.1 A UX |
| 3,360,681 | 12/1967 | Kohler et al. | 315/83 |
| 2,220,832 | 11/1940 | Walker | 240/7.1 R |

Primary Examiner—Louis R. Prince
Assistant Examiner—Frederick Shoon
Attorney—Toren & McGeady

[57] ABSTRACT

In the automobile lighting system disclosed, a rear lamp includes two filaments. One of the filaments is turned on along with the parking lights and headlamps. A fog lamp switch completes a circuit to energize the second filament. The latter produces a more powerful light than the first filament.

10 Claims, 1 Drawing Figure

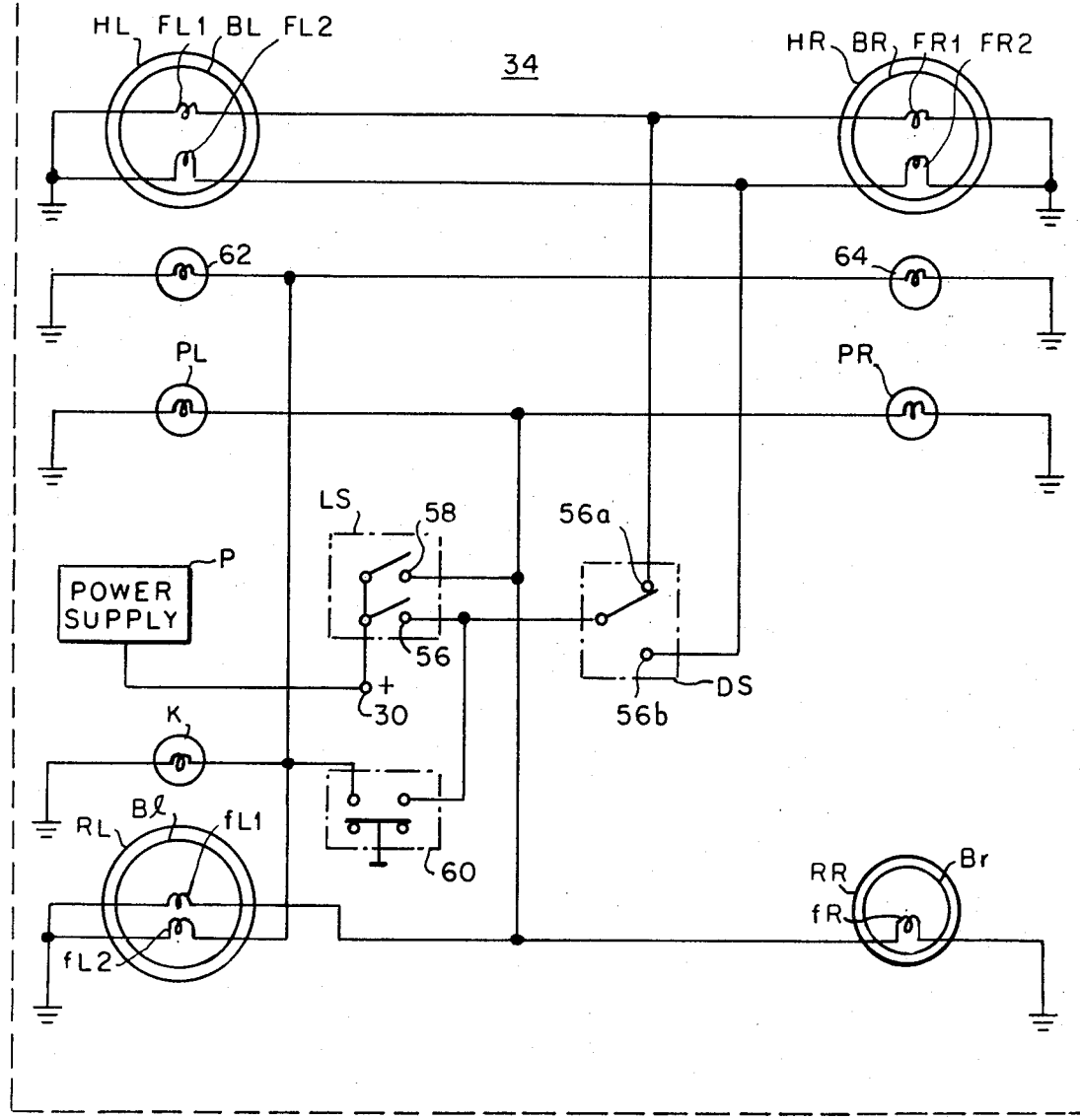

3,723,721

LIGHTING SYSTEM FOR MOTOR VEHICLES

BACKGROUND OF THE INVENTION

This invention relates to lighting systems for automotive vehicles, particularly vehicles which, in addition to headlights and rear lights, are supplied with fog lights.

Known lighting systems for automotive vehicles are often modified by the incorporation of a separate rear fog lamp which is used to show up the back of the car in fog. This supplemental rear fog lamp is switched on together with the fog lights on the front of the vehicle. The addition of such a rear fog lamp involves extra manufacturing expense both in terms of labor and equipment. This added expense can be considerable if the lamp is connected in series with existing fog lights.

An object of this invention is to improve lighting systems for automotive vehicles.

Another object of this invention is to provide a lighting system for automotive vehicles whose rear lights, when coacting with the headlights and the front fog lights, produce the advantages of serially-connected rear fog lights, without the disadvantages of the substantial expenditures of a serially connected separate rear fog lamp.

SUMMARY OF THE INVENTION

In accordance with a feature of the invention these objects are achieved in a lighting system for automotive vehicles, by furnishing at least one of the rear lamps with a twin filament bulb, one of whose filaments has a low output and the other of whose filaments has a higher output, and by making the low output filament switchable with the ordinary vehicle light switch and by making the higher output filament switchable by the automobile's fog lamp switch.

According to another feature of the invention, the fog lamp switch simultaneously actuates the second filament of the one of the rear lamps and the forward fog lamps of the vehicle.

According to another feature of the invention, a pilot lamp indicates operation of the fog lamps.

The system of the present invention obviates the need to provide a separate rear fog lamp. The rear lamp with twin filaments lights up with a varying brilliance depending upon the position of the fog lamp switch. Hence, the effect is the same as provided by a separate rear fog lamp controlled by a fog lamp switch. However, the expenditure involved in installing the system of the present invention into an automotive vehicle is considerably less than in previously known systems.

The second filament of the rear fog lamp furnishes a greater light output than the output of the rear lamps. Therefore, according to a feature of the invention the second rear filament of the rear lamp may be energized only when the headlights of the automotive vehicle are also turned on.

These and other features of the invention are pointed out in the claims forming a part of this specification. Other objects and advantages of the invention will become obvious from the following detailed description when read in light of the accompanying drawing.

BRIEF DESCRIPTION OF THE DRAWING

The drawing is a circuit diagram illustrating a lighting system embodying features of the invention.

DESCRIPTION OF PREFERRED EMBODIMENTS

In FIG. 1 a terminal 30 of a power supply P in a vehicle 32 energizes the headlights, generally designated 34, through a light switch LS and a dip switch DS. In the headlights 34 of the vehicle 32 respective right and left head lamps HL and HR are each provided with twin filament bulbs BL and BR. The bulb BL includes two filaments FL1 and FL2 of which the filament FL2 produces the brighter light when energized. The bulb BR includes a filament FR1 which produces a light that is less bright than a filament FR2 also in the bulb BR.

When the light switch LS is closed, that is when it is moved from the position shown so that one of its armatures contacts a terminal 56, and when the dip switch DS is in its dipped position, that is in the position shown so that its armature contacts a terminal 56a, the power supply P furnishes current from the terminal 30 to the filaments FL1 and FR1. This places the lamps HL and HR in low beam. When the dip switch DS is switched over, so that the armature contacts the terminal 56b, the power supply P stops energizing the filaments FL1 and FR1 and begins energizing the filaments FL2 and FR2. Since these filaments, when energized, provide brighter light than the filaments FL1 and FR1 the headlights furnish full beam illumination. In this latter position the filament bulbs FL2 and FR2 having the greater power are connected, in parallel with each other, to the terminal 30.

When the light switch LS is on it also connects the terminal 30 through a terminal 58, to energize two parking or side lights PL and PR.

The switch LS also connects the terminal 30 to respective rear lamps RL and RR. The left rear lamp RL is provided with a twin filament bulb B1. The latter contains a low power filament fL1, and a brighter more powerful filament fL2. The right rear lamp RR includes a bulb Br having a filament fR corresponding to the filament fL1. The less bright filament fL1 is connected in parallel with the filament fR of the bulb Br in the right rear lamp RR.

In each case the connection through the filaments is directly to ground which forms the negative terminal of the power supply P. The power supply in the vehicle is formed by the usual battery whose positive side constitutes the terminal 30.

In operation, when the light switch LS is turned on, the power supply P energizes the filaments FL1 and FR1 in the head lamps HL and HR as well as the filaments fL1 and fR in the rear lamps RL and RR, as long as the dip switch DS is in the position shown contacting the terminal 56a. This may be considered the low or "-brights off" condition. When the full beam is put on by switching the dip switch DS to contact terminal 56b the rear lamps remain on as before but the switch DS disconnects the filaments FL1 and FR1, while connecting the filaments FL2 and FR2. When turned on the switch LS also connects the terminal 30 to the terminal 58. This turns on the parking lights PL and PR in parallel with the rear lights RL and RR.

A fog lamp switch 60 when closed connects the terminal 56 through two forward fog lamps 62 and 64. At the same time it connects the terminal 56 to the brighter filament fL2 in the bulb B1. In this way when the light switch LS is in the on position the fog light switch 60 causes the power supply P to energize the fog lamps 62 and 64 as well as the filament fL2. The left rear lamp then emits a more powerful light signal than the right rear lamp RR because both the filaments fL1 and L2 in the left rear lamp RL are switched on. In effect therefore the filament fL2 when combined with the filament fL1 constitutes a fog lamp at the rear of the automobile. The fog lamp switch 60 is connected to the terminal 56 of the light switch LS. This makes sure that the fog lamps 62 and 64 and the rear fog lamp can be switched on only when the headlight HL and HR are switched on in either the dipped or full beam position.

A pilot lamp K connected to the terminal 30 through the fog lamp switch 60 and the switch LS is also switched on when the fog filament fL2 in rear light RL is energized. The pilot lamp K preferably appears in the dashboard panel thereby indicating to the operator that the fog lights are on.

An operator may therefore operate the lamps by turning on the lamp switch LS. This turns on the rear lamps RL and RR by energizing the filaments fL1 and fR1. It also turns on the head lamps HL and HR either in the low or full beam condition depending upon the position of the switch. The operator, by positioning the switch DS can then, without affecting the rear lamps RL and RR, turn on the low or full beam. At the same time, as long as the light switch LS is on, the parking lights PL and PR are energized through the terminal 58.

In the event that the operator encounters fog he turns on the fog lamp switch 60. This fails to affect the head lamps HL and HR. However, it adds the light available from the fog lamps 62 and 64 by connecting these lamps in parallel across the power supply P through the terminal 56 and ground. At the same time it lights a pilot light K on the dashboard. Moreover, the fog lamp switch 60 brightens the left rear lamp RL by passing current from the supply through the filament fL2 of the bulb B1. This increases the brightness of the left rear lamp RL and causes it to behave as a fog lamp for the rear of the car.

According to one embodiment of the invention bulbs BL, BR, B1 and Br constitute separate bulbs located inside the reflectors of the lamps HL, HR, RL and RR. According to another embodiment of the invention the bulbs B1, Br BL and BR constitute so called sealed-beam lamps having their own reflectors. In such a case the lamps are composed of the mountings and energy plugs for the sealed-beam lamps.

While specific embodiments of the invention have been shown and described in detail to illustrate the application of the inventive principles, it will be understood that the invention may be embodied otherwise without departing from such principles.

What is claimed is:

1. A lighting system for automotive vehicles, comprising a plurality of rear lamps, a plurality of fog lamps, a main light switch, a fog light switch, one of said rear lamps having a first filament and a second filament, first circuit means for connecting said main light switch to said first filament so that said first filament may be energized through said main light switch, and second circuit means for connecting said fog light switch to said second filament and said fog lamps so that said second filament and said fog lamps may be energized through said fog light switch, said second circuit means including conductive means connecting said fog lamps and said second filament to said fog light switch so that said fog light switch energizes said fog lamps and said second filaments simultaneously.

2. A lighting system for automotive vehicles, comprising a plurality of rear lamps, a plurality of fog lamps, a main light switch, a fog light switch, one of said rear lamps having a first filament and a second filament, first circuit means for connecting said main light switch to said first filament so that said first filament may be energized through said main light switch, second circuit means for connecting said fog light switch to said second filament and said fog lamps so that said second filament and said fog lamps may be energized through said fog light switch, and head lamps, said first circuit means including conductive means connecting said head lamps to said main lamp switch so as to be operated thereby, said second circuit means including second conductive means for connecting said fog light switch in series with said main light switch so that said fog lamps and said second filament may be energized only when said main light switch switches on said head lamps.

3. A system as in claim 1, further comprising a pilot lamp, said second circuit means connecting said pilot lamp to said fog light switch.

4. A lighting system as in claim 2, further comprising a pilot lamp, said second circuit means connecting said pilot lamp to said fog light switch.

5. A lighting system for automotive vehicles, comprising a plurality of rear lamps, a plurality of fog lamps, a main light switch, a fog light switch, one of said rear lamps having a first filament and a second filament, first circuit means for connecting said main light switch to said first filament so that said first filament may be energized through said main light switch, and second circuit means for connecting said fog light switch through said second filament and said fog lamps so that said second filament and said fog lamps may be energized through said fog light switch, said second filament having a higher light output when energized than said first filament so that said second filament when energized can serve as a rear fog lamp.

6. A system as in claim 5, wherein the number of rear lamps is two and said rear lamps are a right rear lamp and a left rear lamp, said rear lamp having the two filaments being the left rear lamp.

7. A system as in claim 5, wherein said second circuit means includes second conductive means for connecting said fog light switch in series with said main light switch so that said fog lamps and said second filament may be energized only when said main light switch switches on said head lamps.

8. A system as in claim 7, further comprising head lamps, said first circuit means including conductive means connecting said head lamp to said main lamp switch so as to be operated thereby, said second circuit means including second conductive means for connecting said fog light switch in series with said main light switch so that said fog lamps in said second filament may be energized only when said main light switch switches on said head lamps.

9. A system as in claim 5, further comprising a pilot lamp, said second circuit means connecting said pilot lamp to said fog light switch.

10. A system as in claim 8, further comprising a pilot lamp, said second circuit means connecting said pilot lamp to said fog light switch.

* * * * *